July 19, 1927.

I. H. JUDD 1,636,231

BRAKE ATTACHMENT FOR TRACTORS

Filed June 18, 1923          4 Sheets-Sheet 1

INVENTOR.
BY Irving H. Judd
ATTORNEYS

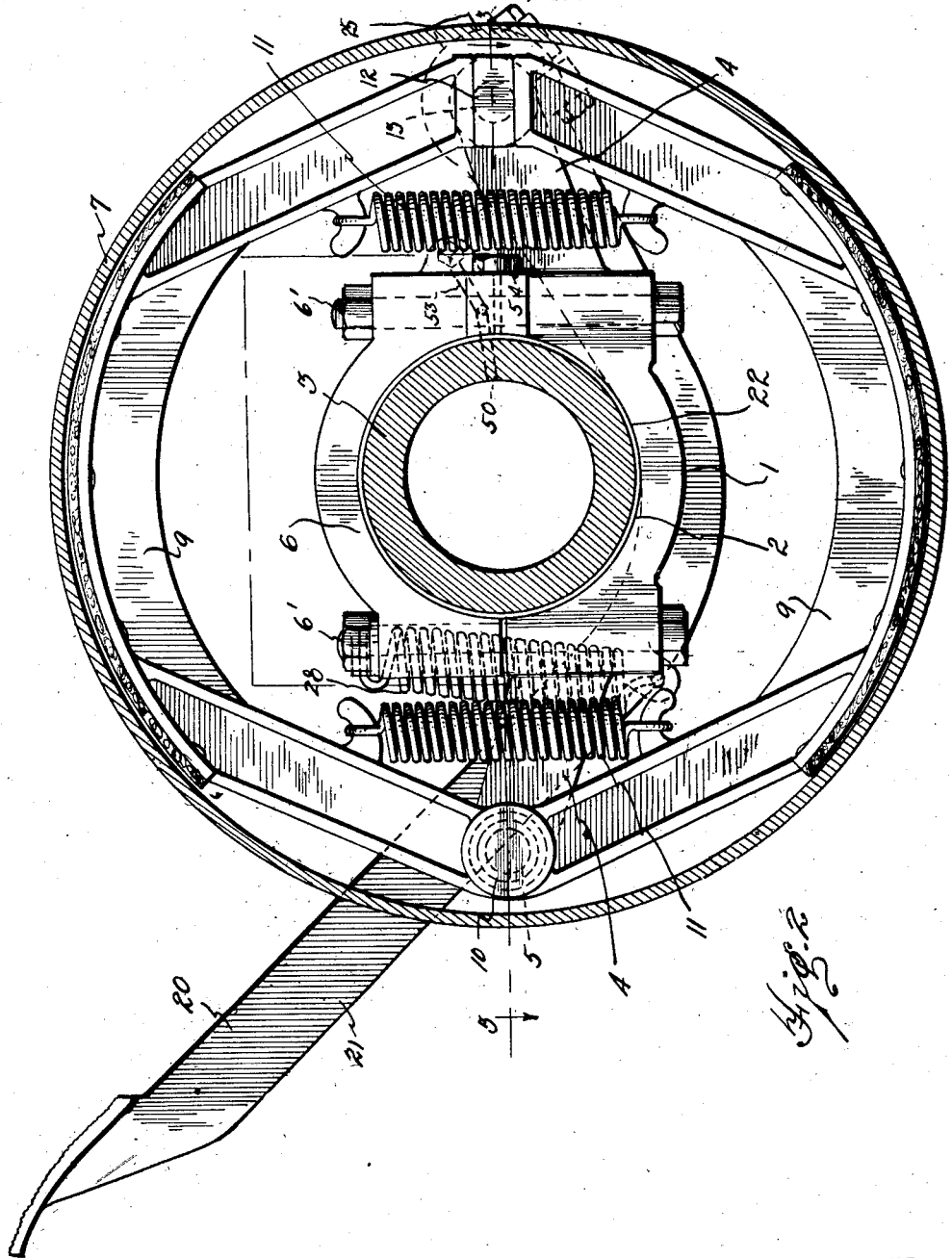

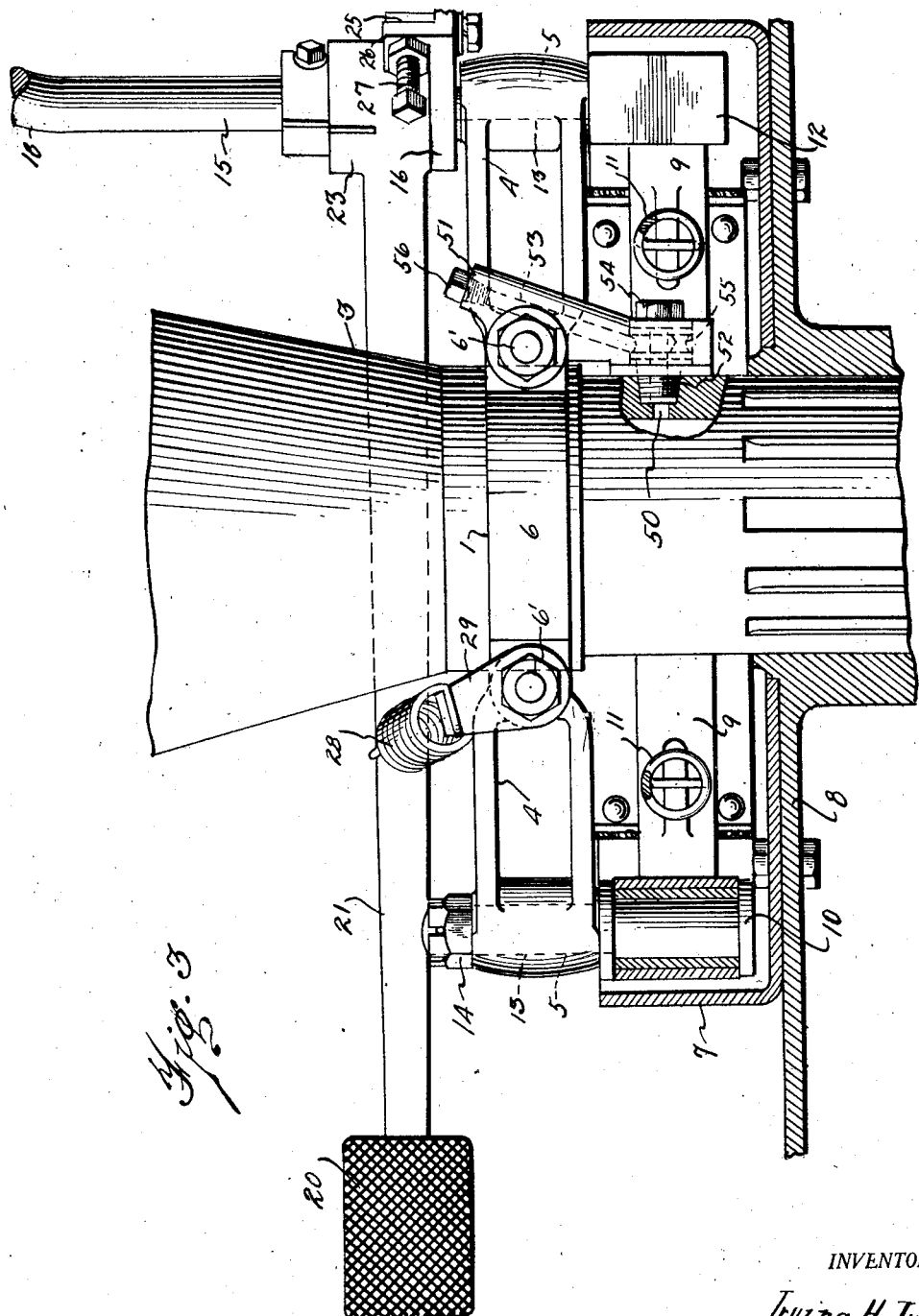

July 19, 1927.
I. H. JUDD
1,636,231
BRAKE ATTACHMENT FOR TRACTORS
Filed June 18, 1923 4 Sheets-Sheet 4
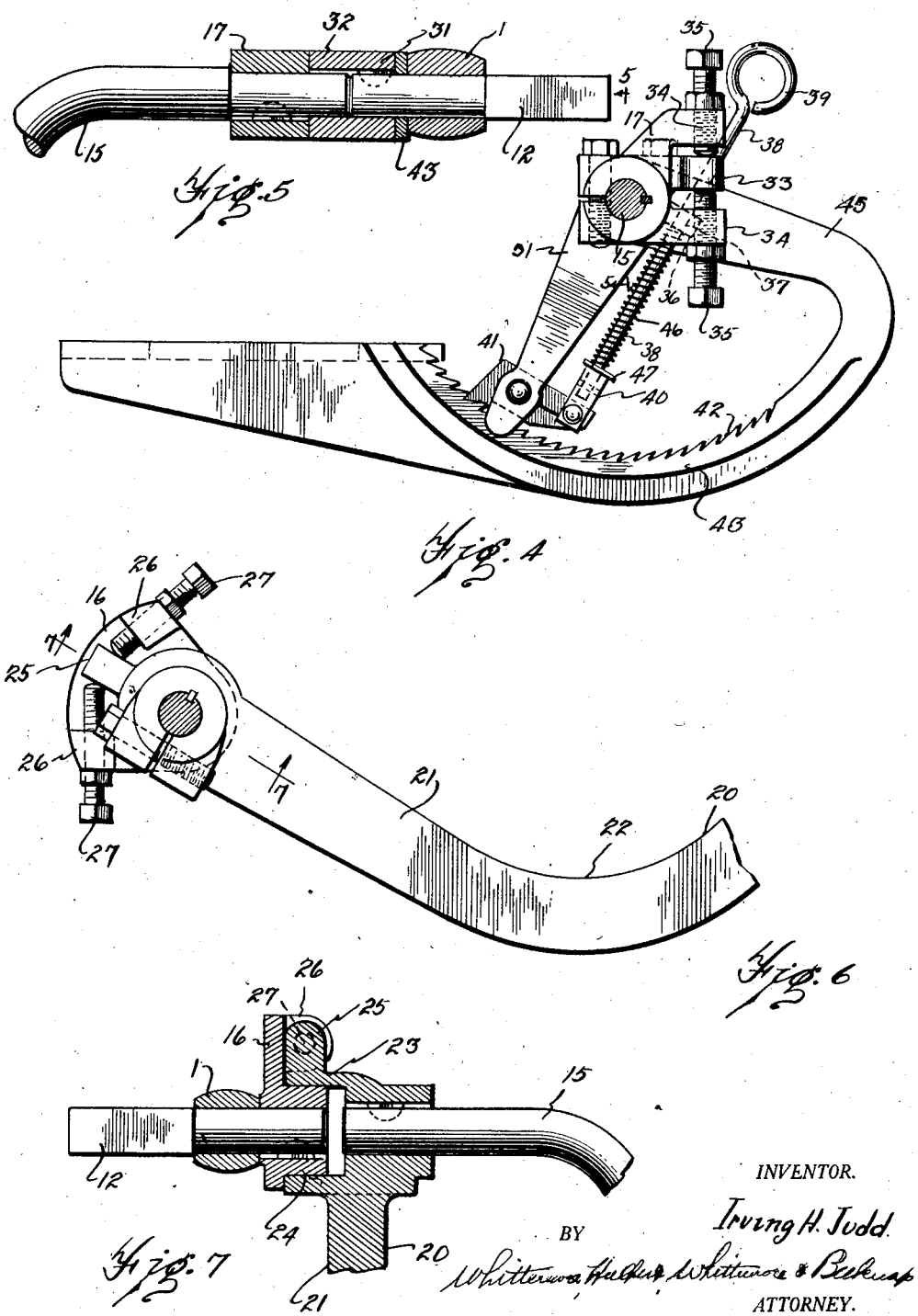
INVENTOR.
Irving H. Judd
ATTORNEY.

Patented July 19, 1927.

1,636,231

UNITED STATES PATENT OFFICE.

IRVING H. JUDD, OF DETROIT, MICHIGAN, ASSIGNOR TO WHITEHEAD & KALES COMPANY, OF DETROIT, MICHIGAN, A CORPORATION OF MICHIGAN.

BRAKE ATTACHMENT FOR TRACTORS.

Application filed June 18, 1923. Serial No. 646,217.

This invention relates to vehicle brakes and refers more particularly to the actuating mechanism for brakes of the internal drum type.

An object of the invention is to provide strong and durable actuating mechanism which may be operated manually to set the brakes but which will return automatically to normal position when the same is released.

Another object is to provide reliable and practical actuating mechanism which is simple in construction and which is easy to operate.

Another object is to provide effective means for detachably holding the actuating mechanism in adjusted position so as to retain the brakes in set position.

Another object is to provide simple and efficient means for adjusting the actuating mechanism whereby the pressure applied to the brakes can be equalized and whereby wear can be taken up in one brake independent of the other.

Another object is to provide means for supplying lubricant to the usual ports in the rear axle housing of the tractor when the attachment is applied thereto.

With the above and other objects in view, the invention consists of certain novel features of construction, combination, and arrangement of parts as will be more fully described and particularly pointed out in the appended claims, In the acompanying drawings:—

Figure 2 is a section on line 2—2 of Figure 1;

Figure 3 is a section on line 3—3 of Figure 2;

Figure 4 is a section on line 4—4 of Figure 1;

Figure 5 is a section on line 5—5 of Figure 4;

Figure 6 is a section on line 6—6 of Figure 1;

Figure 7 is a section on line 7—7 of Figure 6.

Figure 1:
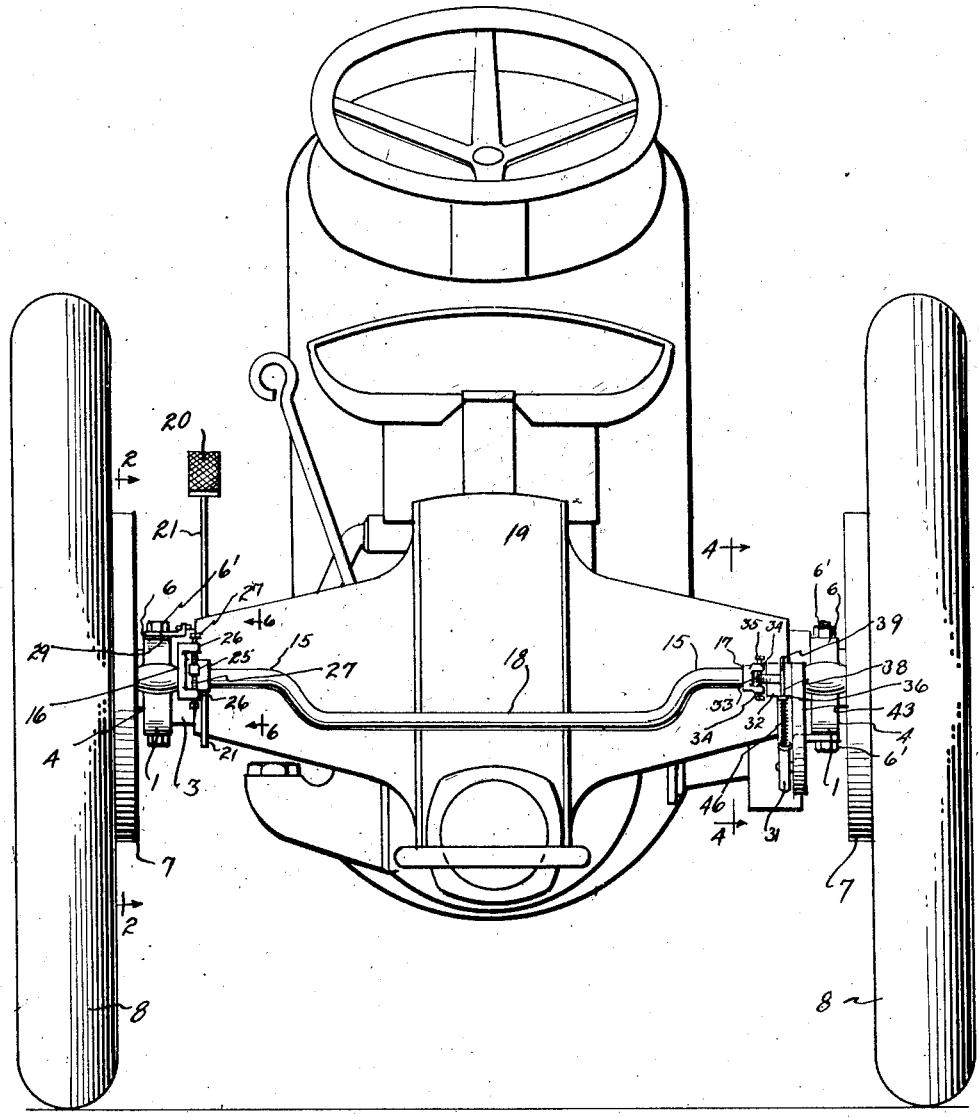
Figure 1 is a rear view of a tractor with my device attached thereto.

Referring now to the drawings in which like characters of reference designate corresponding parts throughout the several views, the numeral 1 designates a pair of anchor arms which have curved intermediate portions 2 engaging the sides of the rear axle housing sections 3 and which have upwardly inclined end portions 4 provided with openings 5. A pair of curved members 6 engage the upper sides of the rear axle housing sections and are secured by means of bolts 6' to the curved portions 2 of the anchor arms to retain the latter in position.

Suitable brake drums 7 are detachably secured to the rear wheels 8 of the tractor and receive brake shoes 9 which are preferably mounted upon headed pins 10 extending through the openings 5 in one end of the anchor arms and which are normally retracted from contact with the internal surfaces of the drums by means of coil springs 11. The shoes 9 are adapted to be pressed against the internal surfaces of the drums by means of suitable cams 12 which are disposed between the free ends of the shoes and which have stems 13 extending through the openings 5 in the other ends of the anchor arms. The headed pins 10 are normally held in position in the anchor arms by means of suitable nuts 14 while the stems of the cams are normally connected to the ends of a horizontal shaft 15 by means of coupling members 16 and 17. The coupling member 16 is preferably located upon the left side of the tractor and is preferably keyed to the stem of one of the cams while the coupling member 17 is preferably disposed upon the right side of the tractor and is preferably keyed to the shaft 15 adjacent to one end thereof. The shaft is preferably offset intermediate the ends thereof as shown at 18 to clear the rear end of the transmission housing 19 and is adapted to be rocked by means of a pedal 20. To actuate the cams for operating the brakes, the pedal is preferably located on the left side of the transmission housing and is provided with an arm 21 which is preferably curved as shown at 22 and which extends beneath the left section of the rear axle housing. The rear end of the pedal arm is preferably keyed to the shaft adjacent to one end thereof and is provided with a boss 23 that receives a boss 24 upon the coupling member 16. A projection 25 is formed upon the rear end of the pedal arm 21 and normally extends between a pair of spaced lugs 26 upon the coupling member 16. Set screws 27 extend through the lugs and are adapted to engage opposite sides of the projection upon the pedal arm. The pedal is normally retained in raised position by means of a coil spring 28 which is connected to the pedal arm 21 intermediate the ends thereof and which is supported from a clip 29 that is mounted upon one of the bolts 6' securing the curved member 6 to the anchor arm 2.

For detachably holding the actuating mechanism in adjusted position so as to retain the brakes in seated position, there is a lever 31 which is preferably keyed to the stem of the cam disposed upon the right side of the tractor and which is provided with a boss 32 that receives the shaft 15. A projection 33 is formed upon the upper end of the lever and normally extends between a pair of spaced lugs 34 upon the coupling member 17 while a pair of spaced set screws 35 extend through the lugs 34 and are adapted to engage opposite sides of the projection 33.

A projection 36 extends laterally from the lever 31 at the upper end thereof and is provided with an opening 37 which receives a slidable pull rod 38. A handle 39 is formed at the upper end of the rod 38 while an eye 40 is detachably secured to the lower end of the rod and is pivotally connected to a pawl 41 which is adapted to engage the ratchet teeth 42 of a quadrant 43. This quadrant is preferably secured by means of the bolts 6' to the under side of the anchor arm 2 disposed upon the right side of the tractor and is provided with an arm 45 which extends forwardly from the rear end of the quadrant and which is preferably mounted on the stem of the cam disposed upon the right side of the tractor. A relatively light coil spring 46 normally retains the pawl out of engagement with the teeth of the quadrant and preferably surrounds the rod 38 between the projection 36 and a washer 47 which is sleeved upon the rod and which engages the eye 40.

In use, when it is desired to actuate both brakes simultaneously to produce the desired braking effect, the pedal 20 may be pressed downwardly whereupon the projection upon the pedal arm will engage one of the set screws upon the coupling member 16 and will cause the adjacent cam to move the shoes of the brake on the left side of the tractor against the cooperating internal surfaces of the drum. Downward movement of the pedal will also rock the shaft 15 and will cause one of the set screws upon the coupling member 17 to engage the projection 33 upon the lever 31 and to rock the latter rearwardly which in turn will rock the stem of the adjacent cam and will cause the latter to move the shoes of the brake on the right side of the tractor against the co-operating internal surfaces of the drum. When the pedal is released, the coil spring 28 will automatically return the pedal arm to normal raised position. This will cause the projection thereon to engage the other set screw upon the coupling member 16 and, assisted by the coil springs 11, will automatically cause the adjacent cam and brake shoes to return to their respective normal positions. The return movement of the pedal will also rock the shaft 15 in the opposite direction and will cause the other set screw upon the coupling member to engage the projection 33 upon the lever 31 and to rock the latter forwardly which, assisted by the springs 11, will cause the adjacent cam and brake shoes to return to their respective normal positions.

Should it be desired to prevent the actuating mechanism from returning to normal position to release the brakes when the latter are set, the rod 38 may be pulled upwardly so that the pawl will engage one of the teeth of the quadrant whereupon the pedal 20 may be released and the pressure of the springs 11 and 28 respectively tending to rock the shaft 15 and lever to normal position, will cause the pawl to bear firmly against the engaging tooth of the quadrant so that the coil spring 46 will be rendered inoperative. The brakes may then be released by pressing slightly upon the pedal 20 to relieve the pressure of the springs 11 and 28 respectively whereupon the coil spring 46 will automatically return the pawl to raised position. The pedal 20 may then be released whereupon the coil springs 11 and 28 will automatically return the actuating mechanism to normal position with the result that the brakes will be released.

Should wear occur more in one brake than in the other, then the set screws upon the coupling members may be adjusted whereby the pressure applied to both brakes will be equal.

In order that lubricant may be supplied to the usual ports 50 in the rear axle housing, the curved members 6 are preferably provided with projections 51 which are adapted to extend against the rear axle housing and which have openings 52 that are adapted to register with the ports 50. Lubricant may be supplied through suitable passages 53 in the projections 51 to the openings 52, while plugs 54 normally close the openings 52 and are provided with annular grooves 55 and communicating radial passages 56 for admitting the lubricant from the passages 53 to the ports 50. Suitable plugs 56 may be used to close the open ends of the passages 53 in the projections 51.

While it is believed that from the foregoing description, the nature and advantages of the invention will be readily apparent, I desire to have it understood that I do not limit myself to what is herein shown and described and that such changes may be resorted to when desired as fall within the scope of what is claimed.

What I claim as my invention is:—

1. The combination with a vehicle having an axle housing, a brake drum, and a brake shoe engageable with said drum, of a cam for moving said shoe against said drum, a stem extending from said cam, a shaft, a coupling member upon said stem, a lever upon said shaft, adjustable means upon said coupling member adapted to control the connection between said shaft and said stem, a member supported from said axle housing, and means upon said lever engageable with the last-mentioned member for detachably holding said shaft whereby said cam will retain said shoe against said drum.

2. The combination with a vehicle having an axle housing, a brake drum and a brake shoe engageable with said drum, a member detachably secured to said axle housing, a cam for moving said shoe against said drum, a stem extending from said cam and mounted in the member aforesaid, a shaft, a coupling member upon said stem, a lever upon said shaft, adjustable means upon said coupling member adapted to control the connection between said shaft and said stem, means for rocking said shaft to actuate said cam, a quadrant supported from said axle housing, a pawl engageable with the teeth of said quadrant for detachably holding said lever whereby said shoe will be retained in engagement with said drum, a pull rod upon said lever for actuating said pawl, and spring means normally retaining said pawl out of engagement with said quadrant.

3. The combination with a pair of axially alined vehicle wheels, of brake drums carried by said wheels, an axle housing arranged between said wheels, braking elements frictionally engageable with said drums, a rock shaft mounted upon and to the rear of said housing exercising control of both of said elements, independently adjustable actuating connections between the ends of said shaft and said elements, and means carried by said housing for rocking said shaft.

4. The combination with a vehicle having an axle housing, a brake drum, and a braking element frictionally engageable with said drum, a stem rotatively controlling said braking element, a shaft, a member coupling said shaft to said stem, means upon said coupling member for adjusting its connection with the stem, a lever upon said shaft, and means carried by the axle housing engageable by said lever for releasably holding the shaft in a brake applying position.

5. The combination with a pair of axially aligned vehicle wheels of brake drums carried by said wheels, an axle housing arranged between said wheels, a detachable member surrounding said axle having a rearwardly extending projection, braking elements frictionally engageable with said drums, a rock shaft journalled in said projection exercising control of both of said braking elements, and means for rocking said shaft including a lever having a portion extending beneath said axle housing and operatively connected to said shaft.

In testimony whereof I affix my signature.

IRVING H. JUDD.